(12) United States Patent
Jusselme

(10) Patent No.: US 10,635,842 B2
(45) Date of Patent: Apr. 28, 2020

(54) METHOD OF IDENTIFYING TECHNICAL DESIGN SOLUTIONS

(71) Applicant: ECOLE POLYTECHNIQUE FEDERALE DE LAUSANNE (EPFL), Lausanne (CH)

(72) Inventor: Thomas Jusselme, Fribourg (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 377 days.

(21) Appl. No.: 15/638,985

(22) Filed: Jun. 30, 2017

(65) Prior Publication Data
US 2018/0011949 A1 Jan. 11, 2018

(30) Foreign Application Priority Data
Jul. 5, 2016 (EP) ..................................... 16178041

(51) Int. Cl.
G06F 17/50 (2006.01)
G06F 30/13 (2020.01)
G06F 30/20 (2020.01)
G06F 119/08 (2020.01)

(52) U.S. Cl.
CPC .............. *G06F 30/13* (2020.01); *G06F 30/20* (2020.01); *G06F 2119/08* (2020.01); *G06F 2219/10* (2013.01)

(58) Field of Classification Search
CPC ............................. G06F 17/5004; G06F 30/13
USPC ............................................................. 703/1
See application file for complete search history.

(56) References Cited

U.S. PATENT DOCUMENTS 8,768,655 B2    7/2014  Singh et al.

OTHER PUBLICATIONS

Choudhary et al., "Analytic target cascading in simulation-based building design", Automation in Construction 14, Nov. 2004, p. 551-568.
Machairas et al., "Algorithms for optimization of building design: A review", Renewable and Sustainable Energy Reviews, Jan. 12, 2013.
Østergård et al., "Thermal Comfort in Residential Buildings by the Millions—Early Design Support from Stochastic Simulations", May 2016.
EP Office Action in application No. 16 178 041.6 dated Sep. 13, 2018, 10 pp.

(Continued)

*Primary Examiner* — Hugh M Jones
(74) *Attorney, Agent, or Firm* — Maschoff Brennan

(57) ABSTRACT

The present invention concerns a method for generating technical design solutions satisfying a given performance target for a building. The method comprises: selecting a design model for the building; selecting a first set of design parameters from a first database; qualifying and/or quantifying the design parameters in the first set; generating a first set of design parameter combinations from the first set of design parameters; attributing the first set of design parameter combinations to the design model to obtain a first set of design alternatives; accessing a second database to determine the impact of the first set of design alternatives on a performance of the building; and ranking the first set of design parameters according to their contribution to the performance of the building.

12 Claims, 3 Drawing Sheets

(56) References Cited

OTHER PUBLICATIONS

Basbagill et al., "Application of life-cycle assessment to early stage building design for reduced embodied environmental impacts", Building and Environment, vol. 60, Nov. 2012, pp. 81-92.
Heiselberg et al., "Application of sensitivity analysis in design of sustainable buildings", Renewable Energy, vol. 34, Issue 9, Mar. 31, 2009, pp. 2030-2036.
Kim et al., "Target Cascading in Optimal System Design", Journal of Mechanical Design, vol. 125, Issue 3, Sep. 2003, 474-480.
Malmqvist et al., "Life cycle assessment in buildings: The ENSLIC simplified method and guidelines", Energy, vol. 36, Issue 4, 2011, pp. 1900-1907.
Miyamoto et al., "Parallel coordinates visualization of energy demand estimation in the early design stages", Apr. 2015, pp. 1.
Miyamoto et al., "Visualisation Tool to Estimate the Effect of Design Parameters on the Heating Energy Demand in the Early Design Phases", Sep. 2015, pp. 1-9.
Morris, "Factorial Sampling Plans for Preliminary Computational Experiments", Technometrics, vol. 33, Issue 2, May 1991, pp. 161-174.
Østergård et al., "Building simulations supporting decision making in early design—A review", Renewable and Sustainable Energy Reviews, vol. 61, 2016, pp. 187-201.
Ritter et al., "Simulation-based Decision-making in Early Design Stages", Proceedings of the 32nd CIB W78 Conference, 2015, pp. 1-10.
Rosolem et al., "A fully multiple-criteria implementation of the Sobol' method for parameter sensitivity analysis", Journal of Geophysical Research, vol. 117, Issue 7, Apr. 2012, pp. 1-18.
Saltelli et al., "Update 1 of: Sensitivity Analysis for Chemical Models", Chemical Reviews, vol. 112, Issue 5, 2012, pp. PR1-PR21.
Extended European Search Report dated Nov. 4, 2016 as received in Application No. 16178041.6, 12 pp.

METHOD OF IDENTIFYING TECHNICAL DESIGN SOLUTIONS

TECHNICAL FIELD

The present invention relates to a method of identifying technical design solutions in order to reach pre-determined design performance targets, such as greenhouse gas (GHG) emission targets. The invention also relates to a design apparatus and to a computer program product for carrying out the method.

BACKGROUND OF THE INVENTION

Commercial and residential buildings account for a large portion of the GHG emissions, which play a key role in climate change. Thus, in order to reduce GHG emissions, it is important to design buildings to be more energy efficient. GHG emission targets will be continuously strengthened in future. On the other hand, constraints resulting from economic crises, and increasing numbers of regulations impact designers' ability to reach given environmental objectives. Thus, it is increasingly difficult to achieve ambitious objectives with limited and decreasing design freedom.

Four obstacles can be identified when trying to integrate climate change issues into architectural pre-design methods. The first obstacle is the lack of publications related to low carbon building references, and which could be used in the design process. There are typically two kinds of publications: those relating mainly to aesthetic solutions, and those relating mainly to ethical problems. Architectural design is an iterative process between problems and solutions. The more iterations, the better the architectural design brief can be designed, for finding a proper solution. Therefore, many types of publications are commonly used as metaphors to transform the design brief into first solutions. Designers commonly prefer aesthetic aspects to ethical aspects. The lack of publications can be explained by the following two reasons:

The recent awareness of climate change limits the number of publications.
  The constant progression of climate change objectives quickly renders the few available publications quickly obsolete.

The second obstacle is the time needed to carry out an environmental assessment. Carrying out a life cycle assessment (LCA) for a building is currently a very time consuming process. LCA, also known as life-cycle analysis, eco-balance, and cradle-to-grave analysis, is a technique for assessing environmental impacts associated with all the stages of a building's life from cradle to grave (i.e. from raw material extraction through materials processing, manufacture, distribution, use, repair and maintenance, to disposal or recycling). LCA is time consuming, because of the necessity to describe dozens or hundreds of building elements. As a consequence, it reduces the possibility of implementing an iterative process, which is crucial for project quality. Fast feedback about the project assessment can be considered to be the most important feature of a decision-making tool. Mathematical methods have been developed to quickly assess the results of a project, avoiding the need to build performance simulations, and using techniques such as multivariate regression. Although the assessment may be performed quickly, it still does not enable an instantaneous global overview of many variants for a better understanding of the problem.

The third obstacle is the uncertainty about the design at an early stage. At this moment, largely incompatible needs co-exist. While robust and reliable LCA requires a high resolution of details of a building project, early design stage implies a low detail resolution. However, it is necessary to perform an LCA early in the design process. If an LCA is performed late in the design process, it decreases the usability of its results for impacting the design. Thus, performing an LCA at an early design stage remains a real challenge. So far, the main ways of tackling this issue have been the LCA methodology improvement, and simplification by reducing the scope of the analysis (over-simplification) by transforming building components into macro-components (sets of components), and implementing data acquisition with computer aided design tools. However, the end result is not precise enough. Simplified techniques can provide results which deviate by as much as 30% from those of a detailed LCA. Moreover, simplification decreases the usability of the LCA because it would then be more difficult to interpret the results.

The fourth obstacle is the non-reproducibility of LCA results. This is due to the method itself, which allows designers to define their own system boundaries (i.e. how extensive the LCA is) and to choose an LCA database (comprising environmental impacts of individual building elements or systems). Thus, two different designers performing an LCA on the same building will produce two different results if the boundaries and LCA database are not clearly specified in the design brief.

As a conclusion, four main obstacles can be identified, which limit the integration of climate change issues at an early design stage:

the lack of publications about the climate change,
  the time required for environmental assessment,
  the uncertainties about the design at an early stage, and
  the non-reproducibility of the results.

Currently, known design exploration methods can only cope with a very limited number of design parameters (e.g. seven) quantified to a few levels (e.g. three). These known methods only take into consideration the energy used by a building, but for computational reasons cannot perform an LCA analysis, because this would require taking into account a much higher number of design parameters (e.g. 20, or preferably more). This would lead to billions of design alternatives. Furthermore, most of the current architectural tools guide designers through an optimisation process, assessment after assessment. These tools allow a project to be improved, but they do not allow designers to understand the impact of each design parameter. Furthermore, these tools do not necessary let the designers to choose the most optimum design alternative, based on a multi-criteria approach, which refers not only to the GHG emission performance, but also to social and economic considerations for instance.

It is an object of the present invention to overcome the problems related to the integration of environmental considerations into architectural design aspects at an early design stage.

SUMMARY OF THE INVENTION

According to a first aspect of the invention, there is provided a method of identifying technical design solutions.

The proposed solution has the advantage that it allows a designer to work with design parameters, which have the greatest impact on the performance of the building. Furthermore, the solution allows an LCA to be carried out at an early stage in the design process. Moreover, there is no need to perform a highly time-consuming iterative design process, which typically leads to an optimized proposition regarding a single design target, but with a high probability of missing other building constraints a designer has to face. By contrast, the present method allows the designer to modify a large number of parameters so that the consequences of these modifications may immediately be made explicit to the designer. The proposed solution enables a high level of understanding of the climate change complexity at an early design stage.

According to a second aspect of the invention, there is provided a computer program product comprising instructions for executing the method according to the first aspect of the present invention.

According to a third aspect of the invention, there is provided an apparatus for carrying out methods described herein.

Other aspects of the invention are recited in the dependent claims attached hereto.

BRIEF DESCRIPTION OF THE DRAWINGS

Other features and advantages of the invention will become apparent from the following description of a non-limiting example embodiment, with reference to the appended drawings, in which.

DETAILED DESCRIPTION OF AN EMBODIMENT OF THE INVENTION

Figure 1:
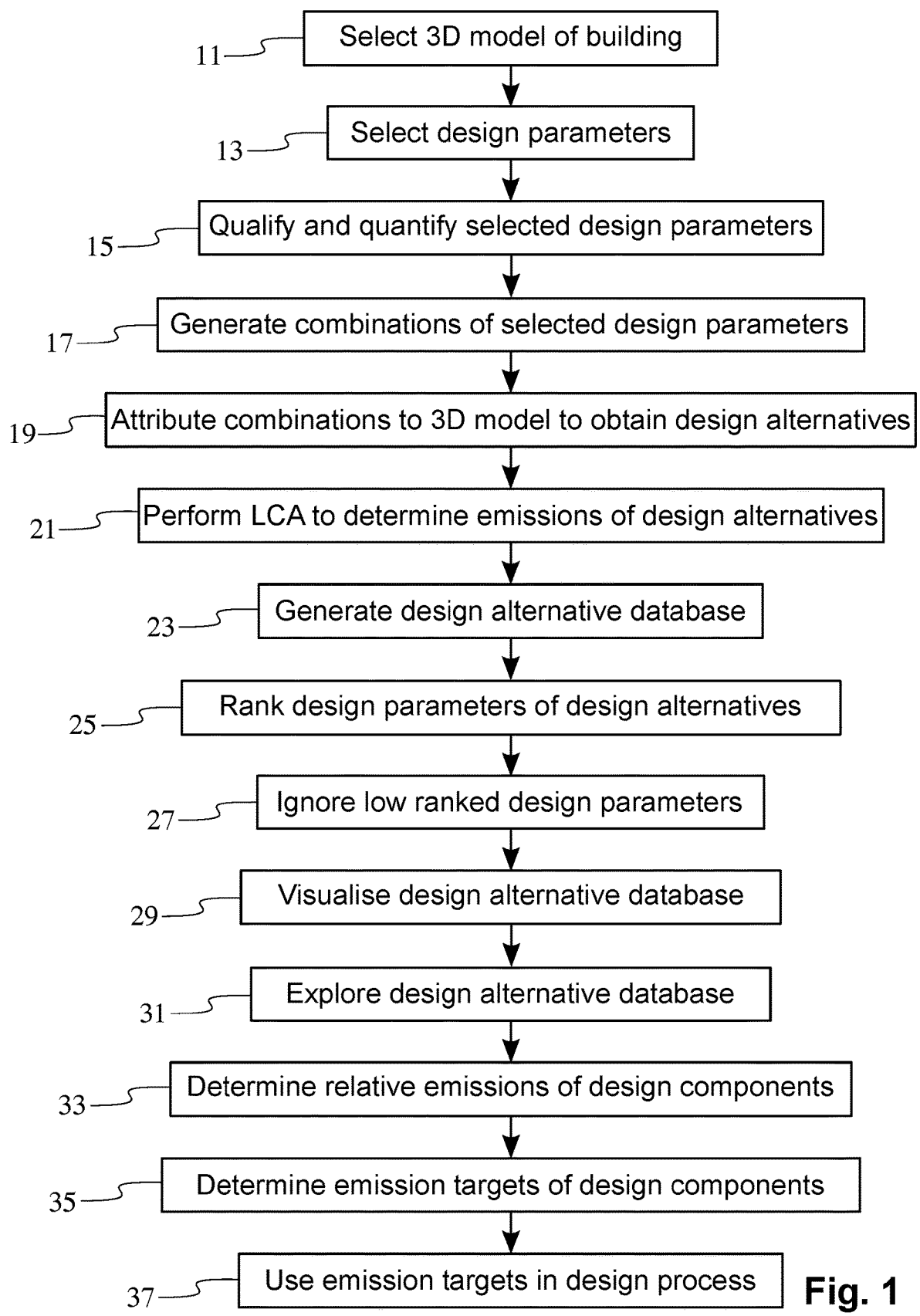
FIG. 1 is a flow chart illustrating a design method according to one example of the present invention.

An example embodiment of the present invention will now be described in detail with reference to the attached figures. The embodiment is described in the context of an architectural design of a building. However, the teachings of the invention are not limited to this application. Identical or corresponding functional and structural elements which appear in the different drawings are assigned the same reference numerals.

Four obstacles have been specified above relating to the early integration of climate change issues into the design process. Each obstacle can be tackled by the corresponding goal (G). The pre-design method presented next tries to realize these goals:

G1: The method should be able to provide design alternatives or references (sets of design parameters) which relate to climate change issues.

G2: The number of references should be as large as possible. The higher the number of references, the easier it is for designers to find a reference that matches every constraint.

G3: For a high usability and understanding, these references should be as detailed as possible.

G4: The reference database should be generated before starting the design stage in order to facilitate the number of iterations during the design process with instantaneous feedback.

The purpose of the proposed architectural pre-design method is to provide a database of references or design alternatives, specifically generated per project according to their characteristics in terms of usage and location. Each reference is in this context a combination of design parameters with their corresponding predicted GHG emissions, specified for a unique project. The database can be explored by designers before or during the design process. Instantaneous overview and exploration of this reference database by data visualisation enables a better understanding, at an early stage, of the architectural consequences of ambitious GHG emission targets. The proposed method in its detailed form is a combination of sensitivity analysis, as explained later, with LCA and data visualization techniques.

Figure 2:
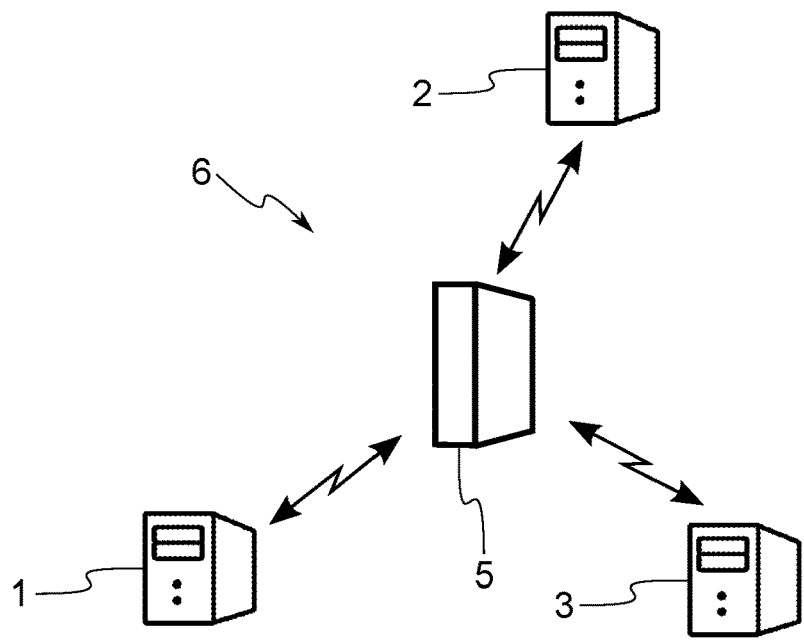
FIG. 2 illustrates a simplified block diagram of the design system where the teachings of the present invention may be applied.

With reference to the flow chart of FIG. 1 and the block diagram of FIG. 2 illustrating the design system 6, the process starts at step 11, where a designer or a data processing unit 5 selects a schematic building model, which in this example is a three-dimensional (3D) model, a purpose of the building (e.g. residential or office building) and the geographical location of the building. Alternatively, in this step the schematic building model is generated. It is to be noted that, a feasibility study of the building may already have been carried out before step 11. The aim of the feasibility study is to determine whether or not it is possible to build the planned building on a particular piece of land. The feasibility study may be a very rough process, where a model used involves only surfaces and volumes. In step 13, a first database 1, referred to as a database of design parameters, is accessed by the data processing unit 5 arranged to implement the present method. The designer or the data processing unit 5 then selects a set of design parameters which influence the building's GHG emissions. The data processing unit 5 may automatically select some parameters which, for example, have in the past been selected for similar buildings, or the same designer has selected in the past. It is possible that the system automatically proposes some design parameters for the designer to simplify the designer's task.

In step 15, the data processing unit 5 qualifies and quantifies the selected design parameters into a range of qualities and quantities. For example, windows may be qualified to single, double or triple glazing, while the window to wall ratio (VWVR) south may be quantified into 50%, 75% and 100%. In step 17, the data processing unit 5 generates some combinations of the selected design parameters. This can be done by a sensitivity analysis, or more specifically by running a part of the sensitivity analysis which is a technique used to determine how different values of an independent input will impact a particular dependent output under a given set of assumptions. The sensitivity analysis used at this stage may include the following steps:

1. Identification of outputs;
2. Identification of inputs;
3. Definition of probability distribution and range of values for the inputs;
4. Choice of an approach;
5. Selection of parameter combinations and calculation of an output distribution given by a generated input matrix;
6. Assessment of the relative influence inputs/outputs.

A sensitivity analysis may be used to rank (step 6 above) design parameters according to their environmental impacts. A sensitivity analysis determines the contribution of the individual design variable or parameter to the total performance (in this example GHG emissions) of the design solution. It can be used to determine which design variables or subset of design variables account for the majority of the building performance variance (and optionally in what percentage). Sensitivity analyses are often grouped into three classes: screening methods, local sensitivity methods and global sensitivity methods. Next, a sensitivity analysis based on a screening method is explained in more detail. Screening methods are used for complex situations which are computationally expensive to evaluate and/or have a large number of design parameters. It is an economical method, which can identify and rank qualitatively the design parameters which control most of the output variability, i.e. the performance. A performance estimation using "standard values" is used. For each design parameter, usually two extreme values are selected on both sides of the standard value. The differences between the result obtained by using the standard value and those obtained using the extreme values are used to determine to which design parameters the building energy performance is significantly sensitive.

A so-called Morris method (Morris MD. "Factorial sampling plans for preliminary computational experiments", Technometrics 1991; 33(2): 161-74 or Heiselberg, P. et al., 2009, "Application of sensitivity analysis in design of sustainable buildings" renew. energy, special issue: Building and Urban Sustainability 34, 2030-2036) is next explained in more detail.

In a first step, the question(s) to be answered by the analysis is/are identified, i.e. the output variable or parameter is defined. In this example, the analysis focuses on the building energy performance (e.g. kWh/(m2 year)). The building costs may be linked to the sensitivity analysis and may form an integrated part of the entire decision process. An appropriate simulation model including its design variables is also selected in this step. Based on the output of a simulation model, it is possible to answer the identified question. The required level of modelling detail depends on the design phase where the sensitivity analysis is applied, as well as on the available knowledge of design parameters. In the very early conceptual or preliminary design phases, relatively simple calculation methods are used because the design solutions are not well defined and the knowledge of design parameters is limited, while in later design phases more detailed models may be used.

In a second step it is determined which design parameters should be included in the sensitivity analysis. This is done by a one-parameter-at-a-time method in which the effect of each design parameter on the building performance is evaluated in turn. A performance estimation using "standard values" for all design parameters is used. For each design parameter, usually two extreme values are selected, i.e. one on both sides of the standard value. The differences between the results obtained using the standard value and those obtained using the extreme values are compared to evaluate to which design parameter the building energy performance is significantly sensitive. A design parameter can be considered to be sensitive, if its value varies substantially. These design parameters are the ones selected for the initial screening. A simple method of determining the design parameter sensitivity is to calculate the output % difference for the extreme values of the design parameter. This "sensitivity index" can be calculated as $$SI = \frac{E_{max} - E_{min}}{E_{max}} 100\%, \quad (1)$$

where $E_{max}$ and $E_{min}$ represent the maximum and minimum output values, respectively, resulting from varying the design parameter over its entire range. If the sensitivity index reaches a defined threshold value, the design parameter is considered to be important and is included in the further analysis.

In a third step, a probability density function is assigned to each design parameter, which is found to be important for building the energy performance in the initial screening. In most cases, it is possible to estimate the limits for the variation of a design parameter in order to estimate the most probable value of the parameter within the limits and to choose the most appropriate probability density function. For each design parameter, the typical value chosen, the variation limits and the probability distribution may depend on architectural considerations, technical possibilities or limitations and/or economical consideration or other issues. Results of sensitivity analysis generally depend more on the selected ranges than on the assigned probability distributions. Typically, three different probability density functions are used; uniform, lognormal and normal distribution.

In a fourth step, input vectors are generated. Various sampling procedures exist, such as: random sampling, latin hypercube sampling and quasi-random sampling. Control of correlation between variables within a sample is important and difficult, because the imposed correlations have to be consistent with the proposed variable distribution. The factorial sampling method proposed by Morris M D. "Factorial sampling plans for preliminary computational experiments", Technometrics 1991; 33(2): 161-74 may be applied to generate the input vectors. The method comprises a number of individually randomized one-factor-at-a-time samples of design parameters where all parameters are varied within their variable space in a way that spans the entire space to form an approximate global sensitivity analysis. Based on the probability density functions of each parameter, random samples of design parameters are generated. Initially, each design variable is scaled to have a region of interest equal to [0,1] according to the probability density function chosen for each variable. Each design parameter may assume a discrete number of values, called levels, l, with a distance of equal size, D.

A design parameter vector, $X_i$, with a number of elements equal to the number of design parameters, k, is assigned a random base value (on a discretized grid). Then a path of orthogonal steps through the k-dimensional parameter space is "followed". The order of the steps is randomized by selecting a new randomized value for one randomized parameter at a time, while keeping all other design parameters constant. After each step, a new design parameter vector is defined. This is continued until all design parameters are represented by two different values creating a set of (k+1) independent design parameter vectors. The procedure is repeated r times, creating a set of r(k+1) independent design parameters vectors. In order to make sure that the region of variation is reasonably covered for all design parameters, a minimum value of r=4 is recommended, while a value of r=10 is recommended to obtain very reliable results. This means that for a case with 20 design parameters, the number of design parameter vectors and corresponding simulations to calculate the output values will be in the range of 44-210.

In a fifth step, an output variable is created for each sample of the design parameters represented in a design parameter vector. This may be achieved by the selected simulation model.

In a sixth and last step the influence of each design parameter on the expected value and the variance of the output parameter(s) are assessed. A number of different techniques can be used, such as rank transformation, regression analysis and scatter plots, all giving different measures of sensitivity. The main purpose of the method is to determine which design parameters may be considered to have effects which are a) negligible, b) linear and additive, or c) nonlinear or involved in interactions with other factors. In this example, the method determines a so-called elementary effect EE of a model $y=y(x_1, \ldots, x_k)$ with input (design) parameters $x_i$. The elementary effect for the ith input parameter in a point x is $$EE(x_1, \ldots, x_k) = \frac{y(x_1, x_2, \ldots, x_{i-1}, x_i + D, x_{i+1}, \ldots, x_k) - y(x_1, \ldots, x_k)}{D}. \quad (2)$$

A number of the elementary effects $EE_i$ of each design parameter is calculated based on the generated samples of each design parameter in step four, i.e. the chosen value of r. The model sensitivity to each design parameter is evaluated by the mean value and the standard deviation of the elementary effects:

$$\mu = \sum_{i=1}^{r} |EE_i|/r \quad (3)$$

$$\sigma = \sqrt{\sum_{i=1}^{r} |EE_i - \mu|^2/r}, \quad (4)$$

where μ is the mean value of the absolute values of the elementary effects determining if the design parameter is important, and σ is the standard deviation of the elementary effects, which is a measure of the sum of all interactions of $x_i$ with other factors and of all its non-linear effects. r is the number of elementary effects investigated for each parameter or the number of repetitions of the procedure in step four. The result of the sensitivity analysis is a list of important design parameters and a ranking of the design parameters by the strength of their impact on the output, μ.

Returning to the flow chart of FIG. 1, in step 19, the data processing unit 5 attributes the combinations of the design parameters (which have been qualified and/or quantified) to the building's 3D model. This provides design alternatives described by the design parameters and/or design components and systems. Each design alternative is in fact a building-specific 3D model with a combination of the different design parameters. A design component is something on which GHG emissions can be assessed. A design parameter influences the performance (in this example the GHG emissions). For example, a wall is a design parameter and component, because GHG emissions can be assessed for a wall, and it influences the performance of the building. On the other hand, for instance, a natural ventilation or lighting control are only design parameters, but they are not design components because GHG emissions cannot be assessed for them. However, it is to be noted that most of the design parameters are also design components. Tables 1 and 2 below give some examples of design components and design parameters and how they can be quantified into a range of numerical values.

TABLE 1

| Components | | Main materials employed |
|---|---|---|
| Backfill | | Demolition of brick structure |
| Excavation | | Mechanical |
| Foundations | | Reinforced concrete, Bitumen waterproofing, mortar |
| Floors | Structure | Reinforced concrete or wood |
| | Insulation | Cellulose fibre, glass wool or polystyrene |
| Roof | Coverings | Concrete, mortar, plaster, parquet or ceramics. |
| Walls | Structure | Reinforced concrete, brick, or wood |
| | Insulation | Cellulose fibre, glass wool, or polystyrene |
| | Coverings | Polyethylene, plaster or mortar. |
| Windows | | Single, double, triple glazing with wood, aluminium or PVC frames |
| Doors | | Wood glazed door or not |

TABLE 2

| Parameters | Values | | | |
|---|---|---|---|---|
| Shape | 1 | 2 | 3 | — |
| WWR* south | 50% | 75% | 100% | — |
| WWR east and west | 25% | 50% | 75% | 100% |
| WWR north | 20% | 40% | 60% | 80% |
| Windows type | double glazing | triple glazing | — | — |
| Frame quality | metal | PVC-XL* | wood + PUR* | |
| Frame quantity | 5% | 10% | 15% | 20% |
| Rooftop PV* | 25% | 50% | 75% | 100% |
| Natural ventilation ratio | 0% | 30% | 60% | 100% |
| Lighting timing | SEA* | SEA | SEA | SEA |
| | SEA schedule | 80% SEA | 65% SEA | 50% SEA |
| Lighted surface | 25% surface | 50% surface | 75% surface | 100% surface |
| Appliances | SEA 380/4 | 80% SEA 380/4 | 60% SEA 380/4 | 40% SEA 380/4 |
| Heating system (kg CO2/MJ) | 0.005 | 0.01 | 0.02 | 0.05 |

*Window to wall ratio (WWR), society of engineers and architects (SEA), photovoltaic (PV), polyvinyl chloride PVC-XL, polyurethane (PUR)

In step 21, the LCA is carried out by the data processing unit 5 for the design alternatives to determine GHG emissions of the different design alternatives. To do this, a second database 2, referred to as a life cycle inventory database, is consulted. The life cycle inventory database 2 includes various design parameters and components and their environmental impacts. One life cycle inventory database 2 may typically be used for various kinds of buildings. The LCA is carried out as a part of the sensitivity analysis (step 6 described earlier). The building's lifetime is considered to be 60 years. The life-cycle impacts are calculated from the decomposition of the design alternatives into building components and systems. The following equation may be used for this calculation:

$$I_f = \sum_{i=1}^{n} m_i \cdot k_{f,i} \cdot \left( \left\lfloor \frac{LB}{LM_i} \right\rfloor + 1 \right) + \sum_{k=1}^{p} C_t \cdot k_{f,t}, \quad (5)$$

where $I_f$ [kg CO2—eq] is the environmental impact of building f; n [unity] is the number of components and systems into which the building is decomposed; p [unity] is the number of different types of energy demand; $m_i$ is the mass or quantity of components or systems i;

$$k_{f,i} \left[ \frac{\text{kg CO2} - eq}{\text{kg, unity}} \right]$$

is the environmental impact f associated with the life cycle of one unit mass or quantity i;

$$\left\lfloor \frac{LB}{LM_i} \right\rfloor$$

is the largest integer not greater than $$\frac{LB}{LM_i};$$

LB [years] is the lifetime of the building; $LM_i$ [years] is the lifetime of the component or system i; $C_t$ [MJ] is the consumption of the energy in the operating phase of the building; and $$K_{f,t} \left[ \frac{\text{kg CO2} - eq}{\text{MJ}} \right]$$

is the environmental impact f for the unit energy t.

Figure 3:
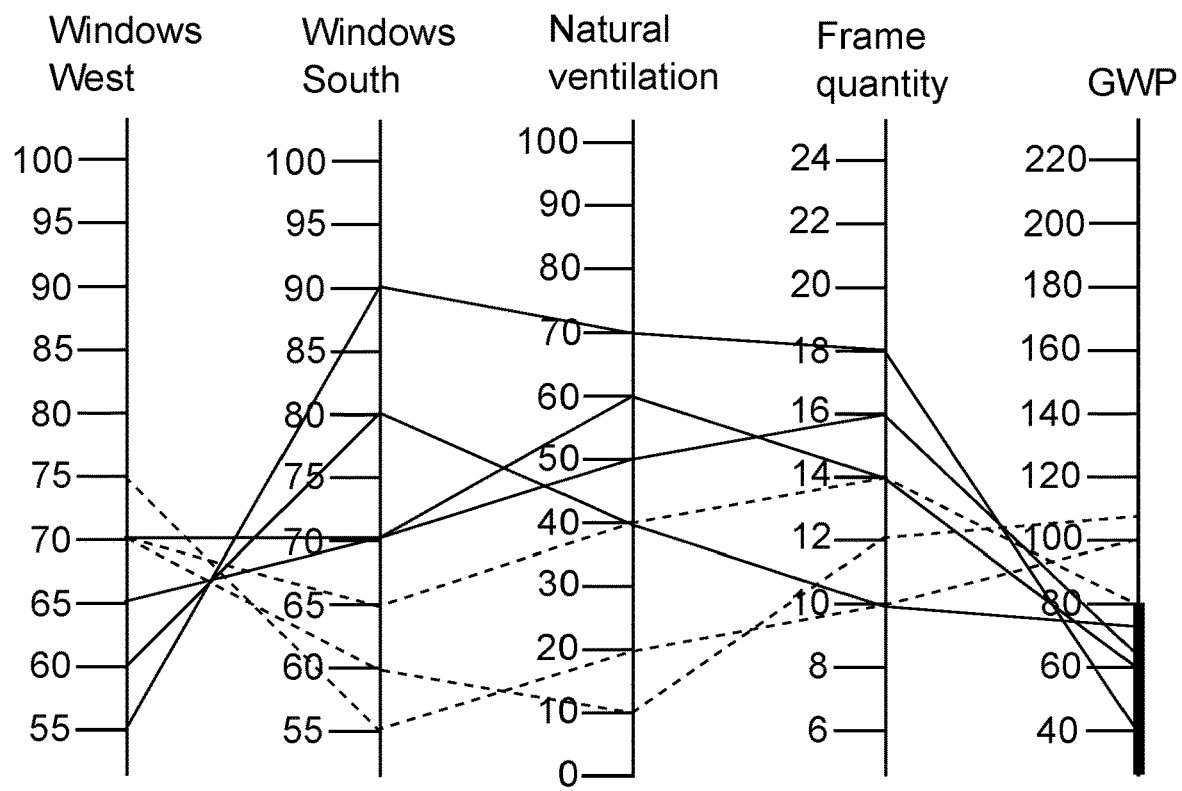
FIG. 3 illustrates a parallel coordinate plot illustrating some design solutions visually.

In step 23, a third database 3, referred to as a design alternative database, is generated. This database comprises the life cycle environmental impacts of the different combinations of the design parameters. In step 25, by using the sensitivity analysis method, the data processing unit 5 ranks the design parameters of all these design alternatives according to their contribution to the GHG emissions. This step may comprise generating an ordered list of design parameters, where the design parameters are ordered for example in a descending order according to their GHG emission impacts. In step 27, the data processing unit 5 or the designer selects a set of design parameters according to their GHG emission impacts by ignoring design parameters which have only very little impact on the overall performance (GHG emissions). Furthermore, if the data processing unit 5 automatically selects the parameters, then the designer can be given the choice to select the number of parameters they want to keep. In step 29, the set of design parameters are visualized (for example substantially in real time) by the data processing unit 5 by using a data visualisation technique, such as a parallel coordinate plot. A part of an example parallel coordinate plot is shown in FIG. 3. Various design parameters are represented by the vertical axes. The right-hand-most vertical line represents the life-cycle GHG emissions (global warming potential (GWP)). Parallel coordinates make it possible to easily explore and understand multi-dimensional numerical datasets. Each data point in the dataset may be represented as a polyline plotted according to n parallel lines corresponding to the n dimensions of the data. The parallel lines may be presented vertically and equally spaced. The polylines are drawn along the horizontal axe with vertices crossing the vertical parallel lines at the position that correspond to the relative value of this data point for the considered dimension. One of the advantages of this technique is that the axes can be arranged in different ways, in order to group, for instance, similar dimensions to present data first according to the most discriminant dimensions or to identify correlations between pairs of dimensions. It can be used in combination with other visualisation techniques using link and brush mechanisms, and in conjunction with mining techniques for instance to highlight clusters of data.

In step 31, the designer explores the design alternatives. The designer may apply constraints on the GHG emissions and/or on one or more of the design parameters and then see what design alternatives remain possible. Once the constraints have been applied, the results can be viewed substantially in real time. In the example of FIG. 3, the solid polylines illustrate design alternatives, which fulfil a design constraint of GWP below 80 kg CO2/person year. The dotted polylines show the design alternatives for which GWP≥80 kg CO2/person year.

In step 33, the data processing unit 5 assesses the relative weight (in percentage) of the GHG emissions of the design components and systems in the design alternative database 3. This is done based on the LCA carried out on the design alternatives in step 21. In step 35, the data processing unit 5 determines performance targets (in this example GHG emission targets) for the design components and systems in the design alternative database. In step 37, the designer uses the GHG emission targets for the design components and systems in the design process. More concretely, the designer may now introduce one or more new design component(s) and/or system(s) and they would know the emission target the new design component(s) and/or system(s) should fulfil. It is also possible to divide the design process of the building into sub-systems and/or sub-components and it would be possible to design these sub-systems in parallel (i.e. simultaneously), since these sub-systems each have their specific GHG emission target. In this way, the whole design process can be simplified.

Figure 4:
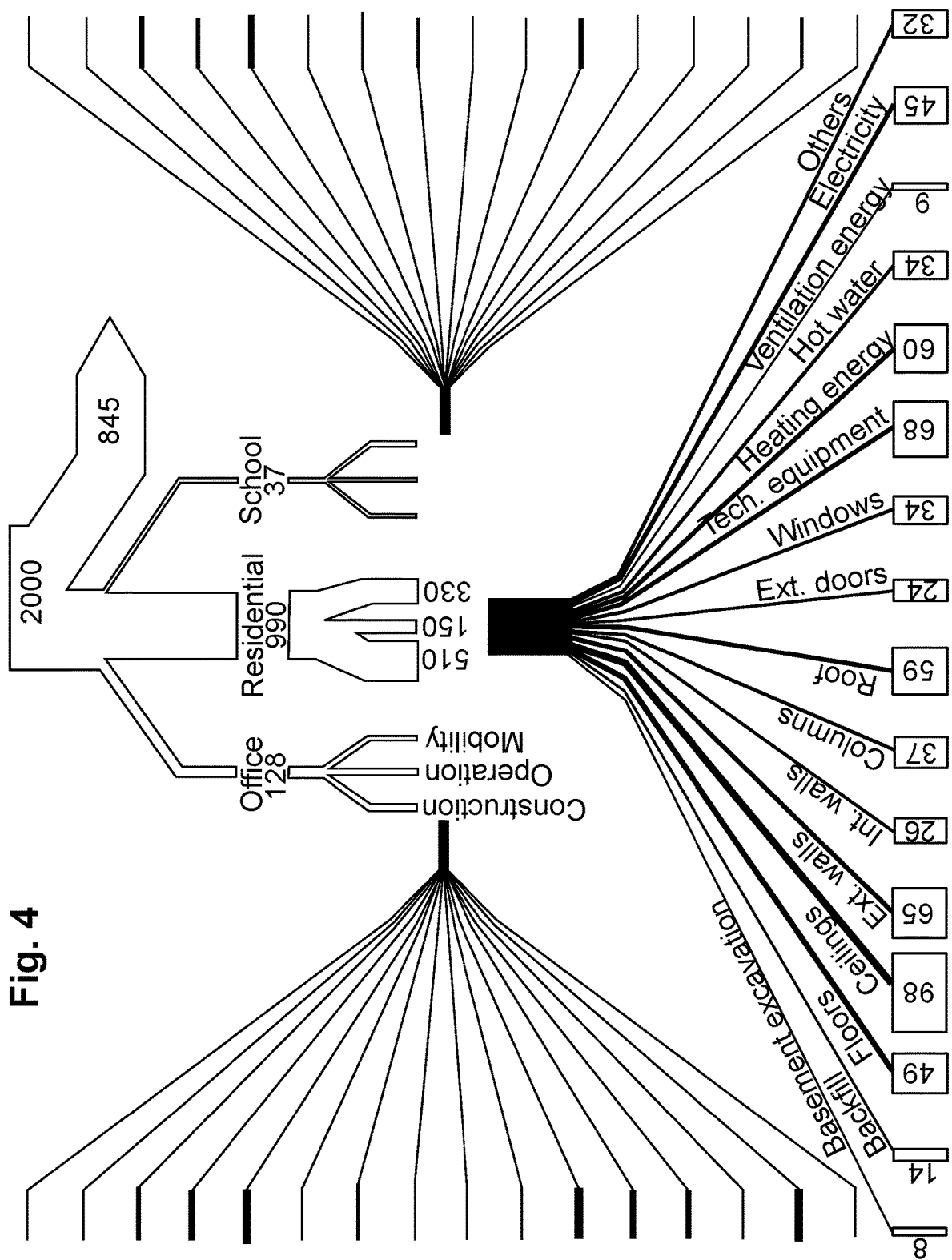
FIG. 4 schematically illustrates a target cascading approach used to divide the building level emission targets into sub-targets.

The steps 33, 35, and 37 may be carried out by a process called target cascading. Once the LCA performances of the design alternatives have been obtained, it is possible to apply the target cascading, and more specifically an approach called "top down and bottom up" to this population (design alternatives), which is specifically developed for each new project. Here "top down" refers to the fact that an objective is fixed at the building level for GHG emissions. "Bottom up" on the other hand refers to the fact that the objective is divided into sub-targets at the component or system level according to the relative weight of the average GHG emission impacts of these components and systems. The target cascading approach is schematically illustrated in FIG. 4, where the numerical values indicate the GHG emissions per year and expressed by kg CO2—eq/person year. The relative weight depends on the population of design alternatives which are specifically generated for each building project. Also, when constraints are applied to the visual representation, targets are updated according to the design alternatives population that fits these constraints.

As explained above, the target cascading approach is an interesting way of simplifying the building's LCA by decomposing the building into components and systems (or sub-systems). Target cascading guides designers towards optimal targets at the component and/or system level, allowing them to assess smaller perimeters than the entire building, and attributes responsibilities to all the design team members. Furthermore, in the present invention, the target cascading approach is done dynamically, i.e. it is possible to change the targets of the components and/or systems. Changing one target also changes at least one of the remaining targets to compensate the target which was first changed. On the other hand, if the target cascading is static, i.e. the targets remain unchanged during the entire design process, the designers do not have the ability to play with the sub-targets (at the component and system level), even if they reach the global target (at the building level). For this reason, in a static approach, it would not be possible to implement a bad technology, even if it were possible to compensate for it with other very efficient components and/or systems. By implementing a dynamic target cascading approach, the designer's freedom to choose new components is not restricted as long as the global target at the building level can be achieved.

The above described method may be modified by for example so that after step 25, the process continues in step 13 but so that the design parameters are selected based on the ranking obtained in step 25. In other words, the design parameters that have only little impact on the GHG emissions may be ignored. The process thus only concentrates on the design parameters which have the greatest importance as far as the GHG emissions are concerned. Furthermore, as the process continues, it is possible to apply a second sensitivity analysis method for example in steps 19, 21 and 25 as these steps are carried out for the second time. In this manner, it would be possible to obtain more combinations than with the Morris approach explained above, and the design alternative database would be updated accordingly. The second sensitivity analysis may be a variance-based sensitivity analysis, which is a form of global sensitivity analysis. Working within a probabilistic framework, it decomposes the variance of the output of the model or system into fractions which can be attributed to inputs or sets of inputs. For example, given a model with two inputs and one output, one might find that 60% of the output variance is caused by the variance in the first input, 30% by the variance in the second, and 10% due to interactions between the two. These percentages may be directly interpreted as measures of sensitivity. Variance-based measures of sensitivity are attractive because they measure sensitivity across the whole input space (i.e. it is a global method), they can deal with nonlinear responses, and they can measure the effect of interactions in non-additive systems. An example of such a variance-based method is a so-called Sobol method such as disclosed for example in "A fully multiple-criteria implementation of the Sobol' method for parameter sensitivity analysis", Rafael Rosolem et al., *Journal of geophysical research*, vol. 117, D07103, 2012. The Sobol method uses the Monte Carlo strategy and gives quantitative and highly reliable results. Also, it is possible to understand interaction between the input parameters. However, comparing to the Morris method, the computational time is increased by a factor 100.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims. For example, it was explained above that the first, second and third databases are all physically separate databases. However, in a further variant of the invention, they could just be one database instead.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A computer-implemented method of generating technical building design solutions satisfying a given greenhouse gas emission and/or energy performance target for a building, the method comprising:
    obtaining a multidimensional building design model for the building;
    obtaining a first set of building design parameters from a first database;
    qualifying the building design parameters in the first set into a range of qualities and/or quantifying the building design parameters in the first set into a range of numerical values;
    generating a first set of building design parameter combinations from the first set of building design parameters;
    attributing the first set of building design parameter combinations to the multidimensional building design model to obtain a first set of building design alternatives;
    accessing a second database to determine life cycle environmental impacts of the first set of building design alternatives on a greenhouse gas emission and/or energy performance of the building;
    ranking the first set of building design parameters according to their contribution to the greenhouse gas emission and/or energy performance of the building;
    determining relative weights of the greenhouse gas emission and/or energy performance of components and/or systems of the first set of building design alternatives by using a target cascading process;
    determining greenhouse gas emission and/or energy performance sub-targets of the components and/or systems according to the relative weights by using the target cascading process; and
    dynamically adjusting the greenhouse gas emission and/or energy performance sub-targets during the method of generating technical design solutions such that adjusting one sub-target leads to adjusting at least one remaining sub-target to compensate the first-target adjustment.

2. The method according to claim 1, wherein the method further comprises obtaining a second set of building design parameters having the greatest impact on the greenhouse gas emission and/or energy performance of the building, the second set of building design parameters being a sub-set of the first set of building design parameters.

3. The method according to claim 2, wherein the method further comprises proposing only the second set of building design parameters to a designer.

4. The method according to claim 3, wherein the second set of building design parameters is proposed as building design alternatives.

5. The method according to claim 3, wherein the second set of building design parameters is proposed to the designer by a data visualization technique, and more specifically by a parallel coordinate plot.

6. The method according to claim 1, wherein the design model comprises a geographical location of the building and/or a purpose of use of the building.

7. The method according to claim 1, wherein, after the ranking step, the method further comprises obtaining a second set of building design alternatives comprising more building design alternatives than in the first set of building design alternatives, and replacing the first set of building design alternatives with the second set of building design alternatives.

8. The method according to claim 1, wherein the method further comprises storing the first or second set of building design alternatives comprising the impact of the building design alternatives on the greenhouse gas emission and/or energy performance of the building in a third database.

9. The method according to claim 1, wherein a sensitivity analysis is used to generate the first set of parameter combinations, to determine the impact of the first or second set of building design alternatives on the greenhouse gas emission and/or energy performance of the building, and/or to rank the first set of building design parameters according to their contribution to the greenhouse gas emission and/or energy performance of the building.

10. The method according to claim 1, the first database and the second database are physically separate databases or they are one single database.

11. A non-transitory computer program product comprising instructions for implementing the steps of the method according to claim 1 when loaded and run on computing means of a computing device.

12. An apparatus for generating technical building design solutions satisfying a given greenhouse gas emission and/or energy performance target for a building, the apparatus being configured to perform operations comprising:

obtain a multidimensional building design model for the building;

obtain a first set of building design parameters from a first database;

qualify the building design parameters in the first set into a range of qualities and/or quantify the building design parameters in the first set into a range of quantities;

generate a first set of building design parameter combinations from the first set of building design parameters;

attribute the first set of building design parameter combinations to the multidimensional building design model to obtain a first set of building design alternatives;

access a second database to determine life cycle environmental impacts of the first set of building design alternatives on a greenhouse gas emission and/or energy performance of the building;

rank the first set of building design parameters according to their contribution to the greenhouse gas emission and/or energy performance of the building;

determine relative weights of the greenhouse gas emission and/or energy performance of components and/or systems of the first set of building design alternatives by using a target cascading process; and determine greenhouse gas emission and/or energy performance sub-targets of the components and/or systems according to the relative weights by using the target cascading process; and dynamically adjusting the greenhouse gas emission and/or energy performance sub-targets during the method of generating technical design solutions such that adjusting one sub-target leads to adjusting at least one remaining sub-target to compensate the first-target adjustment.

* * * * *